United States Patent [19]
Burnett

[11] 3,854,767
[45] Dec. 17, 1974

[54] ROPE ASSEMBLY
[75] Inventor: Ralph G. Burnett, Kenosha, Wis.
[73] Assignee: Burnett Company Ltd., Kenosha, Wis.
[22] Filed: Aug. 31, 1973
[21] Appl. No.: 393,499

[52] U.S. Cl.................. 294/74, 124/30 A, 403/209
[51] Int. Cl.......................... B66c 1/12, F16g 11/00
[58] Field of Search .... 294/74, 1; 24/115 H, 115 R, 24/31 C; 403/209, 210, 212, 281, 283, 291, 377, 292, 298; 124/30 A

[56] References Cited
UNITED STATES PATENTS

| | | |
|---|---|---|
| 3,367,102 | 2/1968 | Meger............................ 403/212 X |
| 3,583,749 | 6/1971 | Hopkins............................... 294/74 |
| 3,605,201 | 9/1971 | Peterson......................... 403/292 X |
| 3,722,130 | 3/1973 | Handl............................. 24/31 C X |

Primary Examiner—Richard A. Schacher
Assistant Examiner—James L. Rowland
Attorney, Agent, or Firm—Molinare, Allegretti, Newitt & Witcoff

[57] ABSTRACT

In a rope assembly wherein a rope end is inserted down the center of a hollow rope, the rope end is retained in the center of the hollow rope by a retaining ring rigidly affixed to the rope end. The retaining ring has barbs formed thereon to engage the braids of the hollow rope when the rope end is pulled to prevent pullout of the rope end.

8 Claims, 6 Drawing Figures

PATENTED DEC 17 1974    3,854,767
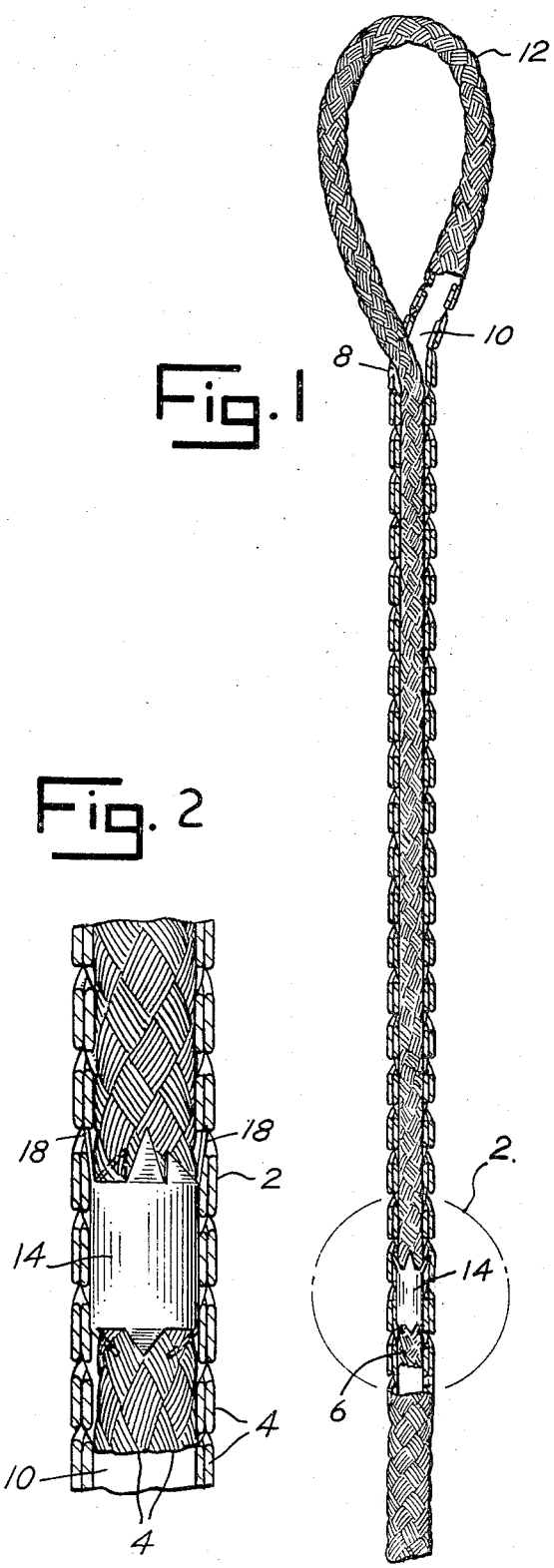
Fig. 1
Fig. 2
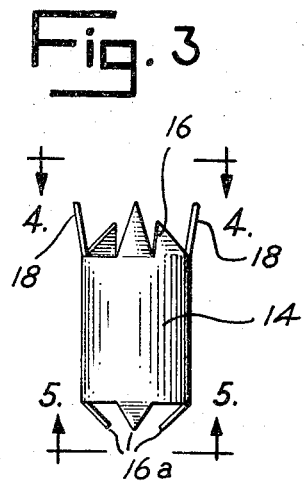
Fig. 3
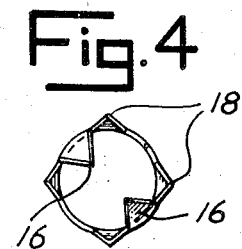
Fig. 4
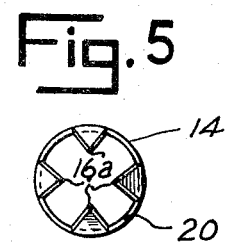
Fig. 5
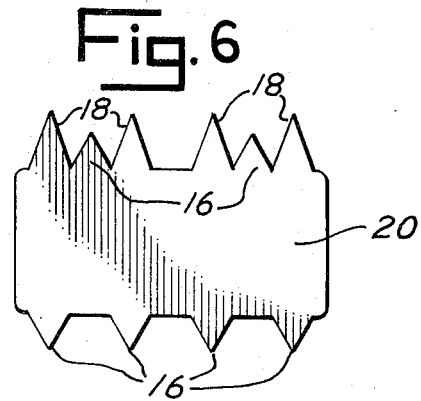
Fig. 6

ROPE ASSEMBLY

BACKGROUND OF THE INVENTION

The present invention relates to an improved rope assembly, particularly a rope assembly in the form of a loop.

The art has recognized that a loop rope assembly can be formed from a flexible, braided rope by inserting the terminus of one end of the rope down the center of the hollow rope along the longitudinal axis thereof, whereby the rope end is retained in the center of the rope against pullout by the rope strands or braids of the hollow rope which tightly grip the rope ends when a tension force is applied to the hollow rope. This method of forming a rope assembly is illustrated in U.S. Pat. No. 3,583,749. This prior art rope assembly works on the same principle as a Chinese finger braid wherein the braid tightly grips fingers inserted into the ends of the braid as the fingers are pulled apart. The greater the tension applied to the loop, the stronger the grip exerted by the hollow rope strands on the end of the rope inserted therein, thus minimizing pullout under high tension loads. In this structure, the end of the rope within the hollow braided rope can be moved or removed by relaxing the tension force on the hollow rope and urging the strands together, thereby releasing their grip on the rope end.

However, hollow braided rope such as illustrated in U.S. Pat. No. 3,583,749 is frequently manufactured from a polymeric material such as polypropylene. In the particular instance of polypropylene, this material is inherently slippery due to its low coefficient of friction. This leads to a tendency for the end of the rope to slip relative to the hollow center of the braided rope, and frequently they become detached. This slippage is particularly apparent when the rope is not maintained under a high tension load.

The art has also recognized that a loop can be formed by folding a rope over and joining the adjacent rope portions together by stitching or clamping. Such a connection method is illustrated in U.S. Pat. No. 1,509,781. This method of connection suffers from the disadvantage that the loop is permanently formed and the size of the loop cannot be readily adjusted to meet varying conditions.

SUMMARY OF THE INVENTION

Accordingly, it is an object of the present invention to provide a means for readily interconnecting a rope end positioned within the center of a hollow braided rope that will reliably interconnect the rope end and the hollow rope under low tension yet will permit adjustment of the position of the rope end within the hollow rope when the tension on the hollow rope is relaxed.

It is a specific object of this invention to provide a retaining ring to be positioned on the rope end positioned within the center of a hollow rope to prevent pullout of the rope end even under low tension.

According to the present invention there is provided a rope assembly which comprises a rope end inserted into the center of a flexible, hollow, braided rope along the longitudinal axis thereof. The rope end is partially retained in the center of the hollow rope against pullout by the rope braids of the hollow rope gripping the rope end when tension is applied to the hollow rope. The rope end inserted into the center of the hollow rope can comprise a single piece rope section wherein one end of the rope is inserted in the other end of the rope to form a circle. Similarly, the hollow rope and the rope end can be two separate pieces of rope joined by inserting the rope end down the center of the braided rope. In a particularly preferred embodiment, the rope assembly is a single piece of rope wherein the rope end is inserted between the rope braids that form the wall of the rope into the center of the rope to form a loop at one end of the rope. In any event, a retaining ring is rigidly affixed to the end portion of the rope to assist the braids of the hollow rope in preventing pullout of the rope end. This retaining ring contains barbs or projections that engage the braid of the hollow rope to prevent pullout of the rope end. Preferably, this retaining ring is manufactured from a metal strip having serrated circumferential edges bent outwards to provide the barbs to engage the braids of the hollow rope.

Other objects and embodiments will become apparent in the following detailed description of the present invention.

BRIEF DESCRIPTION OF THE DRAWINGS

A presently preferred embodiment of the present invention is illustrated in the drawing attached hereto, wherein, like numerals refer to like elements and wherein:

FIG. 1 is a partial sectional view of a loop formed from a single length of rope by inserting the rope end through the wall of the braided rope, with a retaining ring positioned on the rope end to prevent inadvertent pullout of the rope end from the main body of the rope;

FIG. 2 is an enlarged cross-sectional view of the retaining ring positioned on the end of the rope as illustrated in FIG. 1;

FIG. 3 is a detailed side view of the retaining ring;

FIG. 4 is a front end view of the retaining ring, illustrating the barbs that retain the ring on the end of the rope and those that prevent inadvertent pullout of the rope end from within the hollow rope;

FIG. 5 is a back end view of the retaining ring; and

FIG. 6 is a plan view of the metal strip prior to formation of the strip into a ring as illustrated in FIG. 3.

DESCRIPTION OF THE PREFERRED EMBODIMENT

Referring to FIG. 1, there is illustrated a conventional polypropylene, hollow, braided rope 2 containing a loop 12 for use as a dog leash. Rope 2 is formed from braided fiber groups 4 in a manner well known to those trained in the art to define a rope having a hollow center section 10. The end 6 of the rope 2 is inserted through opening 8 in the wall of the hollow rope to form loop 12 and is pushed down the logitudinal axis of the rope, thereby occupying a portion of hollow center section 10. A retaining ring 14 is positioned near the end 6 to aid in retaining the end of the rope within the center 10. This retaining ring is preferably manufactured from a metal such as stainless steel and also serves to provide rigidity to end 6, thereby facilitating the insertion of this end through opening 8 and down the center 10 of the rope.

In particular, referring to FIGS. 2–5, retaining ring 14 is formed from a metal sheet 20 to form a circular ring that fits snugly over end 6. Ring 14 is rigidly retained in position near end 6 by the inwardly turned barbs 16 and 16a that engage and grip the fiber groups 4 of the rope end. Outwardly turned barbs 18 assist the braids of the hollow rope in preventing pullout of the rope when tension is applied thereto by becoming physically engaged with barbs 18. The need for retaining ring 14 is particularly apparent when the hollow rope is manufactured from a ploymer, such as polypropylene, that has a low coefficient of friction which permits slippage between end 6 and the center 10 of the hollow rope. Outwardly extending barbs 18 function, as indicated, to engage the braids of the hollow rope as illustrated in FIG. 2.

Referring to FIG. 6, there is illustrated a metal sheet having a series of serrations along the edges of the sheet. When the sheet is formed into a ring, these serrations are positioned around the circumferential edges of ring 14. The smaller serrations are then pressed or bent inward to form inwardly extending barbs or retention means 16 and 16a, and the larger serrations are bent or pulled outward to form outwardly extending barbs 18. Sheet 20, as indicated, can be manufactured out of metal sheet. Similarly, ring 14 could be manufactured out of a suitable rigid plastic material.

The rope assembly illustrated in FIG. 1 is readily manufactured by stamping out or otherwise forming a small metal sheet or strip such as illustrated in FIG. 6. The barbs or tabs are suitably bent inward and outward and the small sheet is then formed into a ring and placed over the end 6 of the rope. Barbs 16 and 16a are pushed or bent inward to help rigidly affix the ring to the end of the rope. Barbs 16a help prevent displacement of the ring as the free end of the rope is inserted through the side strands of the rope. Barbs 16 help rigidify the rope end to facilitate forcing the rope end between the braids into the hollow center of the braided rope. The two inwardly deflected barbs 16 (FIG. 4) function most importantly during the assembly process. Because barbs 18 point in the opposite direction of loop 12, the end 6 can be readily inserted into the opening 8 in the wall of the hollow rope and pushed down the center 10 of the rope until loop 12 reaches a predetermined size. After the loop is thus formed, the outwardly extending barbs 18 engage the fiber groups of the hollow rope as discussed earlier. However, should the user of the rope assembly decide to subsequently enlarge the size of loop 12, end 6 can be moved by first axially compressing rope 2, thereby releasing the tension on the rope and enlarging the center section 10. End 6 can then be moved a small distance back, away from loop 12, thereby freeing barbs 18 from the fiber groups. Since the center of rope 10 now has a diameter substantially greater than retaining ring 14, end 6 can now be pulled to enlarge the diameter of loop 12. When tension is again applied to the hollow braided rope, retaining ring 14, through barbs 18, will again grip the fibers in fiber groups 4 to retain the end of the rope within rope 2.

A given length of hollow rope can be provided with a loop of any desired size. Once established, the size of the loop will be maintained. One desirable use of the present invention is for dog or like animal leashes.

Though a polymer such a polypropylene is preferred, the rope can be made from polyethylene.

While a presently preferred embodiment of the invention has been disclosed, modifications may be made without departing from the fundamentals of the invention. Accordingly, it is intended this patent cover all patentable features as embodied within the scope of the appended claims.

I claim as my invention:

1. A rope assembly which comprises a flexible, hollow, braided rope and a rope end portion inserted into the center of the hollow rope along the longitudinal axis of the hollow rope, the rope end portion being partially retained in the center of the hollow rope against pullout by the rope braids of the hollow rope gripping the rope end portion within the hollow rope when tension is applied to the hollow rope, and a retaining ring rigidly affixed to a portion of the rope within the hollow rope, said retaining ring comprising retention means for rigidly engaging the ring and rope end portion and barb means for internally engaging the braids of the hollow rope when the rope end portion is pulled relative to the hollow rope to prevent pullout, said retention means comprising first barbs extending inwardly from each end of the retaining ring and said barb means comprising second barbs extending outwardly from one end of the retaining ring.

2. A rope assembly as in claim 1 wherein the rope end portion and hollow rope are a single length of rope.

3. A rope assembly as in claim 2 wherein the rope end is inserted between the rope braids and into the center of the rope at an intermediate point along the rope, to form a loop at one end of the rope.

4. A rope assembly as in claim 1 wherein the rope is ploypropylene.

5. A rope assembly as in claim 1 wherein said retaining ring comprises a metal strip formed to provide said ring, barb means, and retention means.

6. A rope assembly as in claim 5 wherein said metal strip includes serrated circumferential edges, a portion of said serrations being bent outward to provide said barb means that are adapted to interlock with the strands of the hollow rope, and a portion of said serrations being bent inward to provide said retention means.

7. A rope assembly as in claim 6 wherein outwardly bent serrations are longer than the inwardly bent serrations.

8. A rope assembly as in claim 1 wherein said retaining ring is adapted to permit further insertion of the rope end portion into the hollow rope.

* * * * *